United States Patent
Byun

(10) Patent No.: US 8,706,356 B2
(45) Date of Patent: Apr. 22, 2014

(54) METHOD AND SYSTEM FOR DETECTING REDUCER FAULT

(75) Inventor: Tae Wan Byun, GwangMyeong-si (KR)

(73) Assignee: Mando Corporation, Gyeonggi-do (KR)

(*) Notice: Subject to any disclaimer, the term of this patent is extended or adjusted under 35 U.S.C. 154(b) by 638 days.

(21) Appl. No.: 12/903,596

(22) Filed: Oct. 13, 2010

(65) Prior Publication Data

US 2011/0093155 A1 Apr. 21, 2011

(30) Foreign Application Priority Data

Oct. 15, 2009 (KR) .................. 10-2009-0098029

(51) Int. Cl.
*G01M 13/02* (2006.01)
*B62D 5/04* (2006.01)
*G06F 7/00* (2006.01)
*B62D 5/30* (2006.01)
*B62D 15/00* (2006.01)

(52) U.S. Cl.
USPC ............... 701/43; 701/29.1; 701/36; 701/41

(58) Field of Classification Search
USPC .................... 701/41–44, 29.1–29.2
See application file for complete search history.

(56) References Cited

U.S. PATENT DOCUMENTS

| | | | | |
|---|---|---|---|---|
| 6,354,396 | B1* | 3/2002 | Horton et al. ............... | 180/446 |
| 7,500,538 | B2* | 3/2009 | Hara et al. .................. | 180/412 |
| 7,849,957 | B2* | 12/2010 | Hara et al. .................. | 180/446 |
| 2005/0203646 | A1* | 9/2005 | Makino et al. ............... | 700/79 |
| 2007/0233345 | A1* | 10/2007 | Endo et al. .................. | 701/41 |
| 2009/0105909 | A1* | 4/2009 | Yamaguchi .................. | 701/41 |
| 2010/0004823 | A1* | 1/2010 | Nakatsu ...................... | 701/41 |
| 2012/0055730 | A1* | 3/2012 | Mukai et al. ................ | 180/444 |

FOREIGN PATENT DOCUMENTS

| | | | | | |
|---|---|---|---|---|---|
| JP | 2002104211 A | * | 4/2002 | ............... | B62D 5/04 |
| JP | 2008105604 A | * | 5/2008 | | |

* cited by examiner

*Primary Examiner* — Khoi Tran
*Assistant Examiner* — Dale Moyer
(74) *Attorney, Agent, or Firm* — McDermott Will & Emery LLP

(57) ABSTRACT

Disclosed is a method and a system for detecting a reducer fault, which extracts an angle of a steering angle sensor and an angle of a motor position sensor after the initialization of the steering angle sensor and the motor position sensor, and when a difference value between two extracted angles is equal to or larger than a predetermined angle, detects a fault of a reducer for rotation connection between a steering wheel and a motor. The method and the system can accurately detect the fault of the reducer for rotation connection between the steering wheel and the motor included in the motor driven power steering system, thereby effectively preventing occurrence of an accident due to the fault of the reducer.

3 Claims, 2 Drawing Sheets

REDUCER FAULT DETECTION SYSTEM(100)

REDUCER FAULT DETECTION METHOD

METHOD AND SYSTEM FOR DETECTING REDUCER FAULT

CROSS-REFERENCE TO RELATED APPLICATION

This application claims priority from and the benefit of Korean Patent Application No. 10-2009-0098029, filed on Oct. 15, 2009, which is hereby incorporated by reference for all purposes as if fully set forth herein.

BACKGROUND OF THE INVENTION

1. Field of the Invention

The present invention relates to a method and a system for detecting a reducer fault. More particularly, the present invention relates to a method and a system for detecting a reducer fault, which can accurately detect a fault of a reducer for rotation connection between a steering wheel and a motor included in a motor driven power steering system, thereby preventing occurrence of an accident due to the fault of the reducer.

2. Description of the Prior Art

In motor driven power steering system, when a reducer connecting rotation between a steering wheel and a motor is out of order, the steering assistance of the motor is not generated. However, even if the steering assistance of the motor is not generated due to the fault of the reducer, the motor continuously rotates according to the generated torque, so that the steering control may not be accurately operated and the safety of a driver may be also large threatened.

SUMMARY OF THE INVENTION

Accordingly, the present invention has been made to solve the above-mentioned problems occurring in the prior art, and an object of the present invention is to provide a method and a system for detecting a reducer fault, which can accurately detect a fault of a reducer for rotation connection between a steering wheel and a motor included in a motor driven power steering system, thereby preventing occurrence of an accident due to the fault of the reducer.

In order to accomplish this object, there is provided a system for detecting a reducer fault, including: a steering angle sensor initialization unit for initializing a steering angle sensor; a motor position sensor initialization unit for initializing a motor position sensor; and a reducer fault detection unit for extracting an angle of the steering angle sensor and an angle of the motor position sensor after the initialization of the steering angle sensor and the motor position sensor, and when a difference value between two extracted angles is equal to or larger than a predetermined angle, detecting a fault of a reducer for rotation connection between a steering wheel and a motor.

In accordance with another aspect of the present invention, there is provided a method for detecting a reducer fault, the method including steps of: initializing a steering angle sensor, in which the steering angle sensor is initialized; initializing a motor position sensor, in which the motor position sensor is initialized; and detecting a reducer fault, in which an angle of the steering angle sensor and an angle of the motor position sensor are extracted after the initialization of the steering angle sensor and the motor position sensor, and when a difference value between two extracted angles is equal to or larger than a predetermined angle, a fault of the reducer for rotation connection between a steering wheel and a motor is detected.

Accordingly, the present invention can accurately detect the fault of the reducer for rotation connection between the steering wheel and the motor included in the motor driven power steering system, thereby effectively preventing occurrence of an accident due to the fault of the reducer.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
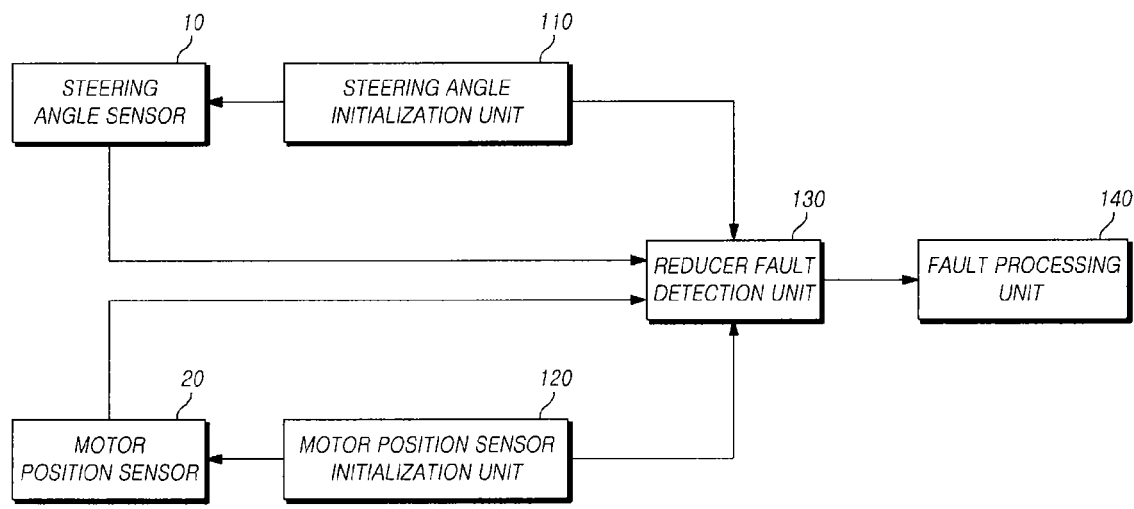
FIG. 1 is a block diagram illustrating a system for detecting a reducer fault according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 is a block diagram illustrating a system 100 for detecting a reducer fault according to an embodiment of the present invention.

Referring to FIG. 1, the system 100 for detecting the reducer fault includes a steering angle sensor initialization unit 110 for initializing a steering angle sensor 10, a motor position sensor initialization unit 120 for initializing a motor position sensor 20 detecting a relative position of a motor, and a reducer fault detection unit 130 for extracting an angle of the steering angle sensor 10 and an angle of the motor position sensor 20 after the initialization of the steering angle sensor 10 and the motor position sensor 20 by the steering angle sensor initialization unit 110 and the motor position sensor initialization unit 120, respectively, and when a difference value between an angle extracted in the steering angle sensor 10 and an angle extracted in the motor position sensor 20 is equal to or larger than a predetermined angle, detecting a fault of the reducer (in a gear box) connecting rotation between a steering wheel and a motor.

The initialization of the steering angle sensor 10 and the motor position sensor 20 by the steering angle sensor initialization unit 110 and the motor position sensor initialization unit 120, respectively, means that information related to the steering angle sensor 10 and the motor position sensor 20 are set as an initial value, respectively. The initialization includes initialization of the angle of the steering angle sensor 10 and the angle of the motor position sensor 20, respectively.

In the initialization of the motor position sensor 20, the motor position sensor initialization unit 120 can initialize the motor position sensor 20 by renewing the angle of the motor position sensor 20 to the angle (e.g. 0°) of the steering angle sensor 10 initialized by the steering angle sensor initialization unit 110. The motor position sensor 20 recognizes that the angle indicative of the position of the motor immediately after the application of power is 0°. Therefore, in order to recognize an accurate position of a steering wheel, the motor position sensor 20 should renew the angle of the motor position sensor 20 to the angle 0° of the steering angle sensor 10 after the initialization of the steering angle sensor 10.

In the meantime, referring to FIG. 1, the system 100 for detecting the reducer fault according to the embodiment of the present invention can further include a fault processing unit 140 for informing a driver of a fault detection of the reducer, storing a fault detection of the reducer in a vehicle system, or informing a vehicle system of a fault detection of the reducer when the reducer fault detection unit 130 has detected the fault of the reducer connecting the steering wheel and the motor.

By way of example only, when the fault of the reducer connecting the steering wheel and the motor has been detected, the fault processing unit 140 can light a corresponding warning light representing a specific color indicative of the detection of the reducer fault, store a corresponding Diagnostic Trouble Code (DTC) indicative of the detection of the reducer fault, or transmit a fault message including information of the detection of the reducer fault with a steering angle Controller Area Network (CAN) ID.

The system 100 for detecting the reducer fault according to the embodiment of the present invention illustrated in FIG. 1 can be included in the MDPS system or in connection with the MDPS system.

A method for detecting a reducer fault by the system 100 for detecting the reducer fault according to the embodiment of the present invention will be described with reference to FIG. 2 in more detail.

Figure 2:
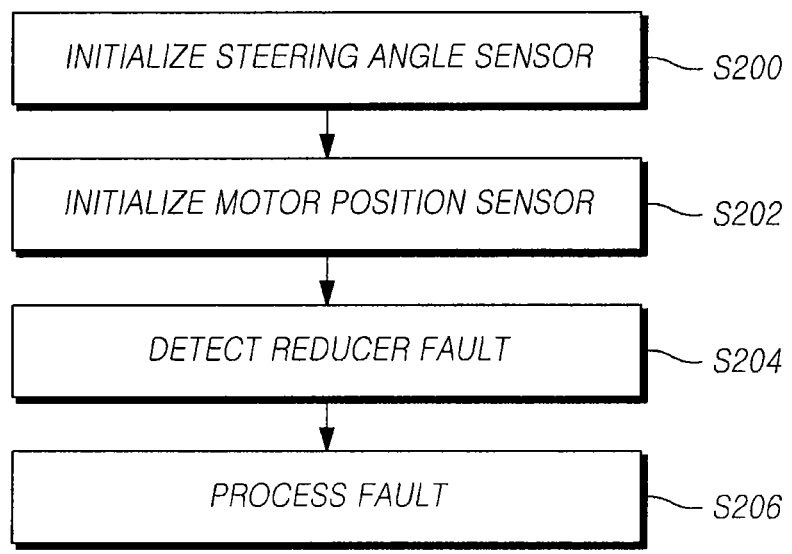
FIG. 2 is a flow chart illustrating a method for detecting a reducer fault according to an embodiment of the present invention.

FIG. 2 is a flow chart illustrating the method for detecting the reducer fault by the system 100 for detecting the reducer fault according to the embodiment of the present invention.

Referring to FIG. 2, the method for detecting the reducer fault by the system 100 for detecting the reducer fault according to the embodiment of the present invention includes initializing the steering angle sensor (S200), in which the steering angle sensor 10 is initialized, initializing the motor position sensor (S202), in which the motor position sensor 20 detecting a relative position of a motor is initialized, and detecting a reducer fault (S204), in which an angle of the steering angle sensor 10 and an angle of the motor position sensor 20 are extracted after the initialization of the steering angle sensor 10 and the motor position sensor 20 by the steering angle sensor initialization unit 110 and the motor position sensor initialization unit 120, respectively, and when a difference value between an angle extracted in the steering angle sensor 10 and an angle extracted in the motor position sensor 20 is equal to or larger than a predetermined angle, a fault of the reducer connecting rotation between a steering wheel and a motor is detected.

Referring to FIG. 2, the method for detecting the reducer fault by the system 100 for detecting the reducer fault according to the embodiment of the present invention includes processing the fault (S206) of informing a driver of a fault detection of the reducer, storing a fault detection of the reducer in a vehicle system, or informing a vehicle system of a fault detection of the reducer after the fault of the reducer connecting the steering wheel and the motor has been detected in the step S204 of detecting the reducer fault.

By way of example only, in the step S206 of processing the fault, when the fault of the reducer connecting the steering wheel and the motor has been detected, a corresponding warning light representing a specific color indicative of the detection of the reducer fault is lightened, a corresponding Diagnostic Trouble Code (DTC) indicative of the detection of the reducer fault is stored, or a fault message including information of the detection of the reducer fault is transmitted with a steering angle Controller Area Network (CAN) ID.

As described above, the present invention according to the embodiment can compare the initialized angle of the steering angle sensor 10 and the initialized angle of the motor position sensor 20 and accurately and promptly detect the fault of the reducer for rotation connection between the steering wheel and the motor included in the MDPS system, thereby preventing occurrence of an accident due to the fault of the reducer.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. In addition, although each of the components may be implemented as independent hardware, some or all of the components may be selectively combined with each other, so that they can be implemented as a computer program having one or more program modules for executing some or all of the functions combined in one or more hardwares. Codes and code segments forming the computer program can be easily conceived by an ordinarily skilled person in the technical field of the present invention. Such a computer program may implement the embodiments of the present invention by being stored in a computer readable storage medium, and being read and executed by a computer. A magnetic recording medium, an optical recording medium, a carrier wave medium, or the like may be employed as the storage medium.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A system for detecting a reducer fault, comprising:
a steering angle sensor;
a motor position sensor;
a steering angle sensor initialization unit configured to initialize the steering angle sensor;
a motor position sensor initialization unit configured to initialize the motor position sensor; and
a reducer fault detection unit configured to extract an angle of the steering angle sensor and an angle of the motor position sensor after the initialization of the steering angle sensor and the motor position sensor, wherein:
the reducer fault detection unit is further configured to, when a difference value between two extracted angles is equal to or larger than a predetermined angle, detect a fault of a reducer for a rotation connection between a steering wheel and a motor; and
the motor position sensor initialization unit initializes the motor position sensor by setting the angle of the motor position sensor to the angle 0° of the steering angle sensor after the steering angle sensor is initialized.

2. The system as claimed in claim 1, further comprising a fault processing unit for, when the fault of the reducer has been detected, lighting a corresponding warning light, storing a corresponding Diagnostic Trouble Code (DTC), or transmitting a fault message with a steering angle Controller Area Network (CAN) ID.

3. A method for detecting a reducer fault of a system including a steering angle sensor initializing unit, a motor position sensor initializing unit, and a reducer fault detection unit, the method comprising steps of:
initializing, with the steering angle sensor initializing unit, a steering angle sensor;
initializing, with the motor position sensor initializing unit, a motor position sensor;
extracting, with the reducer fault detection unit, an angle of the steering angle sensor and an angle of the motor position sensor; and
detecting, with the reducer fault detection unit, a reducer fault, wherein:
when a difference value between two extracted angles is equal to or larger than a predetermined angle, a fault of the reducer for rotation connection between a steering wheel and a motor is detected; and
the motor position sensor is initialized by setting the angle of the motor position sensor to the angle 0° of the steering angle sensor after the steering angle sensor is initialized.

* * * * *